(12) United States Patent
Frost et al.

(10) Patent No.: US 11,122,321 B1
(45) Date of Patent: Sep. 14, 2021

(54) STREAM SYNCHRONIZATION USING AN AUTOMATED DIGITAL CLAPPERBOARD

(71) Applicant: International Business Machines Corporation, Armonk, NY (US)

(72) Inventors: Keith Gregory Frost, Delaware, OH (US); Stephen Arthur Boxwell, Franklin, OH (US); Kyle Matthew Brake, Westerville, OH (US); Stanley John Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/840,679

(22) Filed: Apr. 6, 2020

(51) Int. Cl.
| | | |
|---|---|---|
| *H04N 21/43* | (2011.01) | |
| *H04N 21/2187* | (2011.01) | |
| *H04N 21/433* | (2011.01) | |
| *H04N 21/81* | (2011.01) | |
| *H04N 21/84* | (2011.01) | |

(52) U.S. Cl.
CPC ..... *H04N 21/4307* (2013.01); *H04N 21/2187* (2013.01); *H04N 21/4333* (2013.01); *H04N 21/8106* (2013.01); *H04N 21/84* (2013.01)

(58) Field of Classification Search
CPC .......... H04N 21/4307; H04N 21/2187; H04N 21/4333; H04N 21/8106; H04N 21/84
USPC ....................................................... 348/515
See application file for complete search history.

(56) References Cited

U.S. PATENT DOCUMENTS

| | | | | |
|---|---|---|---|---|
| 5,414,808 | A * | 5/1995 | Williams ................ | G06F 16/40 715/723 |
| 8,700,195 | B2 * | 4/2014 | Thapa ................. | H04L 65/1089 700/94 |
| 2005/0262539 | A1* | 11/2005 | Barton ................. | G11B 27/322 725/90 |
| 2007/0276670 | A1* | 11/2007 | Pearlstein .......... | H04N 21/4341 704/270 |

(Continued)

FOREIGN PATENT DOCUMENTS

| | | |
|---|---|---|
| CN | 110062277 | 7/2019 |
| CN | 106603543 | 8/2019 |

OTHER PUBLICATIONS

"SMPTE timecode," Wikipedia, 2011, 6 pages.
(Continued)

*Primary Examiner* — John W Miller
*Assistant Examiner* — Sean N. Haiem
(74) *Attorney, Agent, or Firm* — Van Leeuwen & Van Leeuwen; Christopher M. Pignato

(57) ABSTRACT

An approach is provided in which the approach receives a media stream comprising an audio stream and a video stream. The audio stream includes a set of audio tones inserted at a set of predetermined frame intervals, and the video stream includes a set of predetermined colors inserted into a set of predetermined pixel locations at the predetermined frame intervals. The approach determines that an audio frame in the audio stream at which the set of audio tones are inserted is misaligned in time with a video frame in the video stream at which the set of predetermined colors are included in the set of predetermined pixel locations. The approach synchronizes the audio stream with the video stream in response to the determination and aligns in time the audio frame with the video frame at one of the predetermined frame intervals.

17 Claims, 10 Drawing Sheets

(56) References Cited

U.S. PATENT DOCUMENTS

| | | | |
|---|---|---|---|
| 2012/0069137 A1* | 3/2012 | Thapa | H04N 7/15 348/14.08 |
| 2013/0027507 A1* | 1/2013 | Thapa | H04N 7/15 348/14.08 |
| 2013/0106980 A1* | 5/2013 | Obaidi | H04L 65/1069 348/14.02 |
| 2019/0088287 A1* | 3/2019 | Segal | G11B 27/031 |
| 2019/0215542 A1* | 7/2019 | Gandhi | H04N 21/234 |

OTHER PUBLICATIONS

Blum, "Synchronization of Live Continuous Media Streams," Proceedings of the 4th Open Workshop on High-Speed Networks, Brest, Sep. 1994, 7 pages.

* cited by examiner

```
900 ─┐
┌─────────────────────────────────────────────────────────────────┐
│ INTERVAL = 500  ◄─ 910                                          │
│ TONES = [ 10, 15, 20000, 21000]  ◄─ 920              ◄─ 930    │
│ PIXELS = [ { color: [ 20, 78, 103 ], coordinates: [ [ 10, 10 ], [ 20, 20], [ 30, 30 ] ], │
│             color: [ 91, 210, 4 ], coordinates: [ [ 50, 50 ], [ 60, 60], [ 70, 70 ] ],   │
│             color: [ 256, 34, 67 ], coordinates: [ [ 80, 80 ], [ 90, 90], [ 100, 100 ] ],│
│             color: [ 92, 82, 14 ], coordinates: [ [ 110, 110 ], [ 120, 120], [ 130, 130 ] ] ] │
│ Process video:                                                  │
│ let AUDIO_DATA = audio data                                     │
│ let VIDEO_DATA = video data                                     │
│ let i = 0                                                       │
│ for each CURRENT_FRAME in VIDEO_DATA             ◄─ 940        │
│     if CURRENT_FRAME.frameNumber % INTERVAL == 0                │
│     AUDIO_DATA[CURRENT_FRAME.timestamp] += TONE[i]              │
│     CURRENT_FRAME[PIXELS[i].coordinates] = PIXELS[i].color      │
│     i = (i + 1) % NUM_EVALS                                     │
└─────────────────────────────────────────────────────────────────┘
```

FIG. 9

```
Process video:
let AUDIO_DATA = audio data
let VIDEO_DATA = video data
let SAVED_EVAL = saved evaluation to check
// For each frame of data
for each CURRENT_FRAME in frames
    // If there is no saved evaluation
    if SAVED_EVAL == null
        // Loop through evaluation data
        for(i = 0, i < NUM_EVALS, i++)
            // If audio data at the current frame contains the evaluation tone
            if AUDIO_DATA[CURRENT_FRAME] contains TONES[i]
                // If the video data at the current frame does not contain the evaluation pixels
                if VIDEO_DATA[CURRENT_FRAME][PIXELS[i].coordinates].color != PIXELS[i].color
                    // Save the pixels to look for and frameNumber and pause the audio
                    SAVED_EVAL = { pixelsToLookFor: PIXELS[i], frameNumber: CURRENT_FRAME }
                    Pause Audio
            // Else if video data at the current frame contains the evaluation pixels
            elseif VIDEO_DATA[CURRENT_FRAME] contains PIXELS[i]
                // If the audio data at the current frame does not contain the evaluation tone
                if AUDIO_DATA[CURRENT_FRAME] does not include TONES[i]
                    // Save the tone to look for and frameNumber and pause the video
                    SAVED_EVAL = { toneToLookFor: TONES[i], frameNumber: CURRENT_FRAME }
                    Pause Video
    // Else if there is a saved evaluation
    else
        // If video data at the current frame contains the evaluation pixels from the saved evaluation
        if SAVED_EVAL.pixelsToLookFor != null &&
        VIDEO_DATA[CURRENT_FRAME][SAVED_EVAL.pixelsToLookFor.coordinates] ==
        pixelsToLookFor.color
            // If the video has gone beyond our configured interval, throw an error
            if CURRENT_FRAME - SAVED_EVAL.frameNumber > INTERVAL
                throw ERROR
            // Else unpause the audio, we're synchronized again!
            else
                SAVED_EVAL = null
                Unpause Audio
        // Else if audio data at the current frame contains the evaluation tone from the saved evaluation
        elseif SAVED_EVAL.toneToLookFor != null && AUDIO_DATA[CURRENT_FRAME] contains
        SAVED_EVAL.toneToLookFor
            // If the audio has gone beyond our configured interval, throw an error
            if CURRENT_FRAME - SAVED_EVAL.frameNumber > INTERVAL
                throw ERROR
            // Else unpause the video, we're synchronized again!
            else
                SAVED_EVAL = null
                Unpause Video
```

*FIG. 10*

STREAM SYNCHRONIZATION USING AN AUTOMATED DIGITAL CLAPPERBOARD

BACKGROUND

Media content streaming is typically a process by which a content distributor provides media content to a content receiver over some type of network connection, such as a satellite channel, a cable channel, or the Internet. A content distributor may be an entity that distributes media content, such as a television station, a streaming Internet channel, a video streaming service, etc. A content receiver may be a system, device, or module that receives the media content at a user's location and provides the media content to the user.

Streaming media is multimedia that is constantly received by and presented to an end-user. Live streaming is the delivery of Internet content in real-time similar to live television broadcasts. Live streaming requires a form of source media (e.g. a video camera, an audio interface, screen capture software), an encoder to digitize the content, a media publisher, and a content delivery network to distribute and deliver the content. A webcast is a live or on-demand presentation streamed over the Internet in audio or audio and video. Webcasting is essentially "broadcasting" over the Internet and is ideal for targeting large audiences.

BRIEF SUMMARY

According to one embodiment of the present disclosure, an approach is provided in which the approach receives a media stream comprising an audio stream and a video stream. The audio stream includes a set of audio tones inserted at a set of predetermined frame intervals, and the video stream includes a set of predetermined colors inserted at a set of predetermined pixel locations at the predetermined frame intervals. The approach determines that an audio frame in the audio stream at which the set of audio tones are inserted is misaligned in time with a video frame in the video stream at which the set of predetermined colors are included in the set of predetermined pixel locations. The approach synchronizes the audio stream with the video stream in response to the determination and aligns in time the audio frame with the video frame at one of the predetermined frame intervals.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 9 is an exemplary diagram that depicts pseudo-code of a digital clapperboard injector; and FIG. 10 is an exemplary diagram that depicts pseudo-code of a digital clapperboard synchronizer.

DETAILED DESCRIPTION

Figure 1:
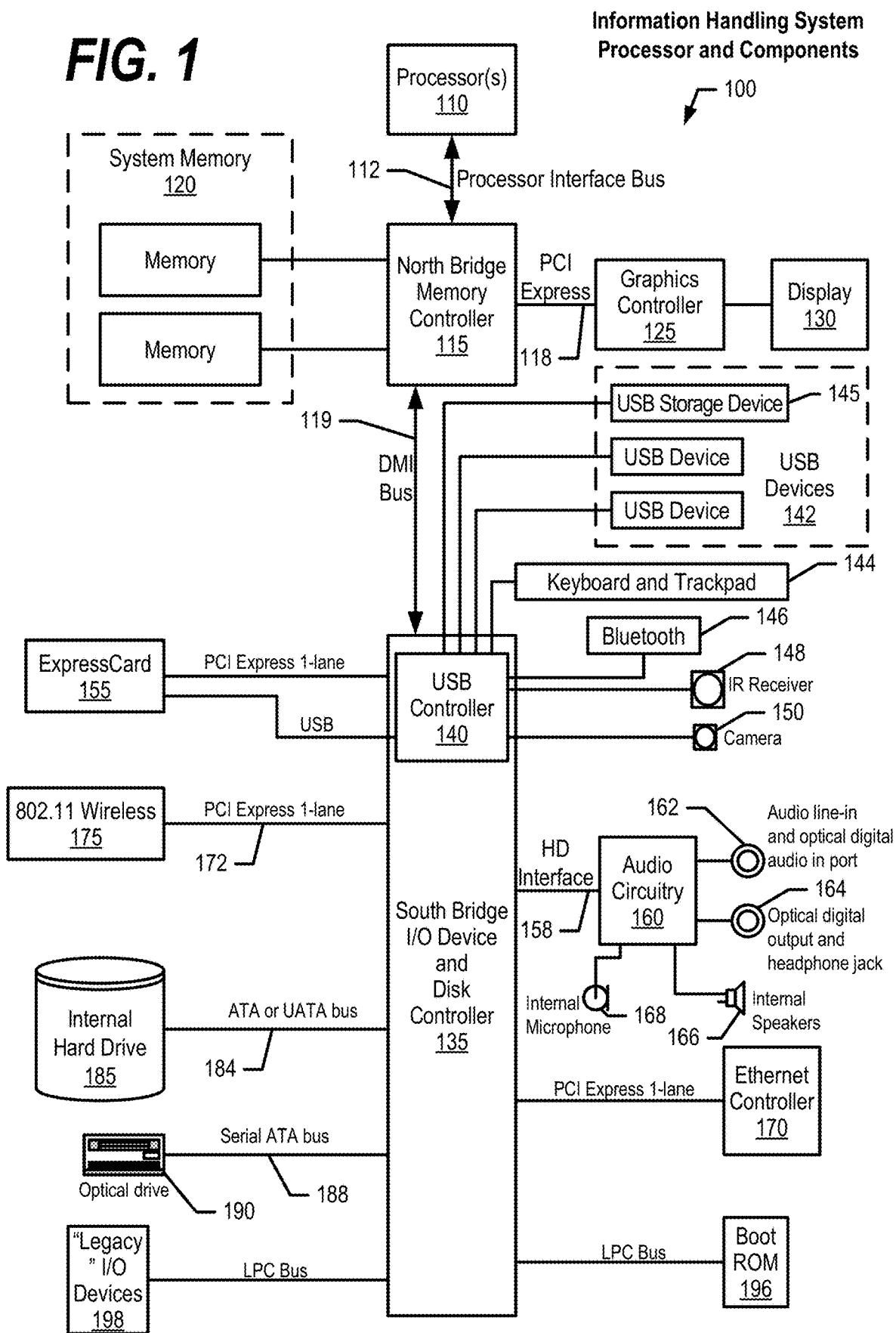
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
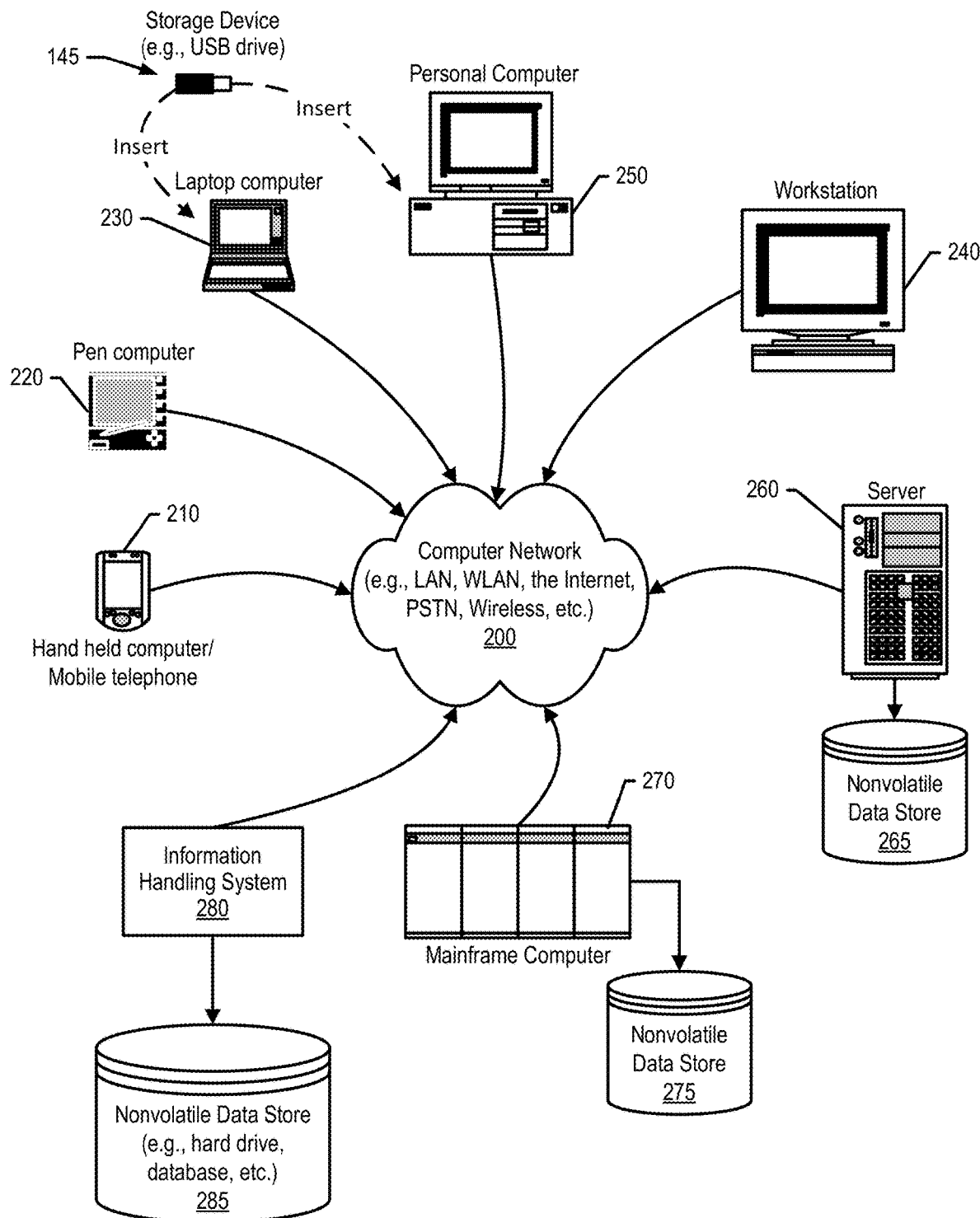
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, webcasting is a live or on-demand presentation streamed over the Internet. A challenge found, however, is that at times the webcast's video signal at the receiving device is not properly synchronized with the webcast's audio signal due to, for example, transmission delays in the network and/or unequal receiving device processing delays.

FIGS. 3 through 10 depict an approach that can be executed on an information handling system that resolves the aforementioned challenges by injecting human inaudible sounds into the audio stream in conjunction with injecting human unperceivable visual patterns in the video stream to automatically re-sync the two streams at a receiving device.

In traditional film making and video production, producers use a 'clapperboard' to assist synchronizing picture with sound and to designate and mark the various scenes as they are filmed and audio-recorded. The clapperboard combines a chalkboard or digital slate with filmsticks that, when shut, generate a sharp "clap" noise that is easily identified on the separate audio track. The audio and video tracks can later be precisely synchronized by matching the sound and movement in the video. Since each take is identified on both the visual and audio tracks, segments of film are easily matched with segments of audio. As discussed below, the approach discussed herein digitally injects "audio claps" into the audio stream and "video claps" into the video stream at specific frame intervals that a receiving device utilizes to synchronize the audio stream with the video stream.

Figure 3:
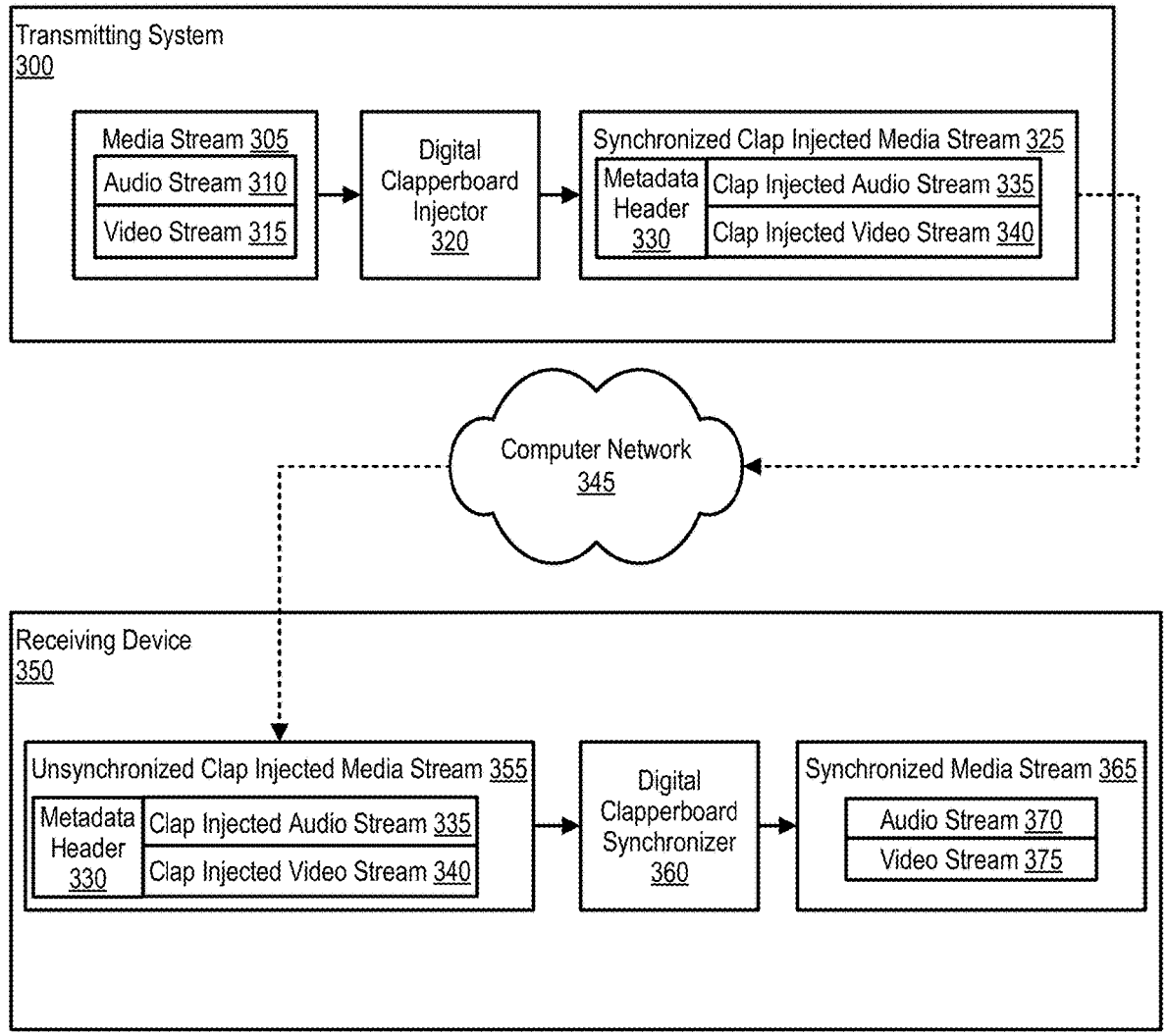
FIG. 3 is an exemplary diagram that depicts a transmitting system injecting digital claps into a media stream and a receiving device synchronizing the audio and video portions of the media stream using the digital claps.

FIG. 3 is an exemplary diagram that depicts a transmitting system injecting clapperboard sets into a media stream and a receiving device synchronizing the audio and video portions of the media stream using the clapperboard sets (audio clap and corresponding video clap). Transmitting system 300 receives or generates media stream 305, which includes audio stream 310 and video stream 315. Digital clapperboard injector 320 selects a frame interval, a random set of inaudible tones for audio claps, along with a random set of colors and a random set of coordinates for video claps. In one embodiment, digital clapperboard injector 320 uses a random number generator to select the clapper values. For example, digital clapperboard injector 320 may use the random number generator to select four audio tone values from 1-20 and 20,000-22,000, and then use the random number generator to select color values between 0-100 for red, green blue (RGB) as well as x/y pixel coordinates between 0-1000 (see FIG. 9 and corresponding text for further details).

Digital clapperboard injector 320 includes the frame interval and clapper information into metadata header 330. Next, at each frame interval, digital clapperboard injector 320 inserts audio claps into audio stream 310 and video claps into video stream 315 to produce clap injected audio stream 335 and clap injected video stream 340, respectively. In one embodiment, digital clapperboard injector 320 injects different clapperboard sets at different frame intervals. For example, at the first frame interval (500th frame), digital clapperboard injector 320 injects the following: TONE: 10, PIXEL: color: [20, 78, 103] at coordinates: [[10, 10], [20, 20], [30, 30]]. Then, at the second frame interval (1,000th frame), digital clapperboard injector 320 injects the following: TONE: 15, PIXEL: color: [91, 210, 4] at coordinates: [[50, 50], [60, 60], [70, 70]].

Transmitting system 300 then sends synchronized clap injected media stream 325 over computer network 345 to receiving device 350. At some point, clap injected audio stream 335 and clap injected video stream 340 become unsynchronized with each other (unsynchronized clap injected media stream 355).

Figure 6:
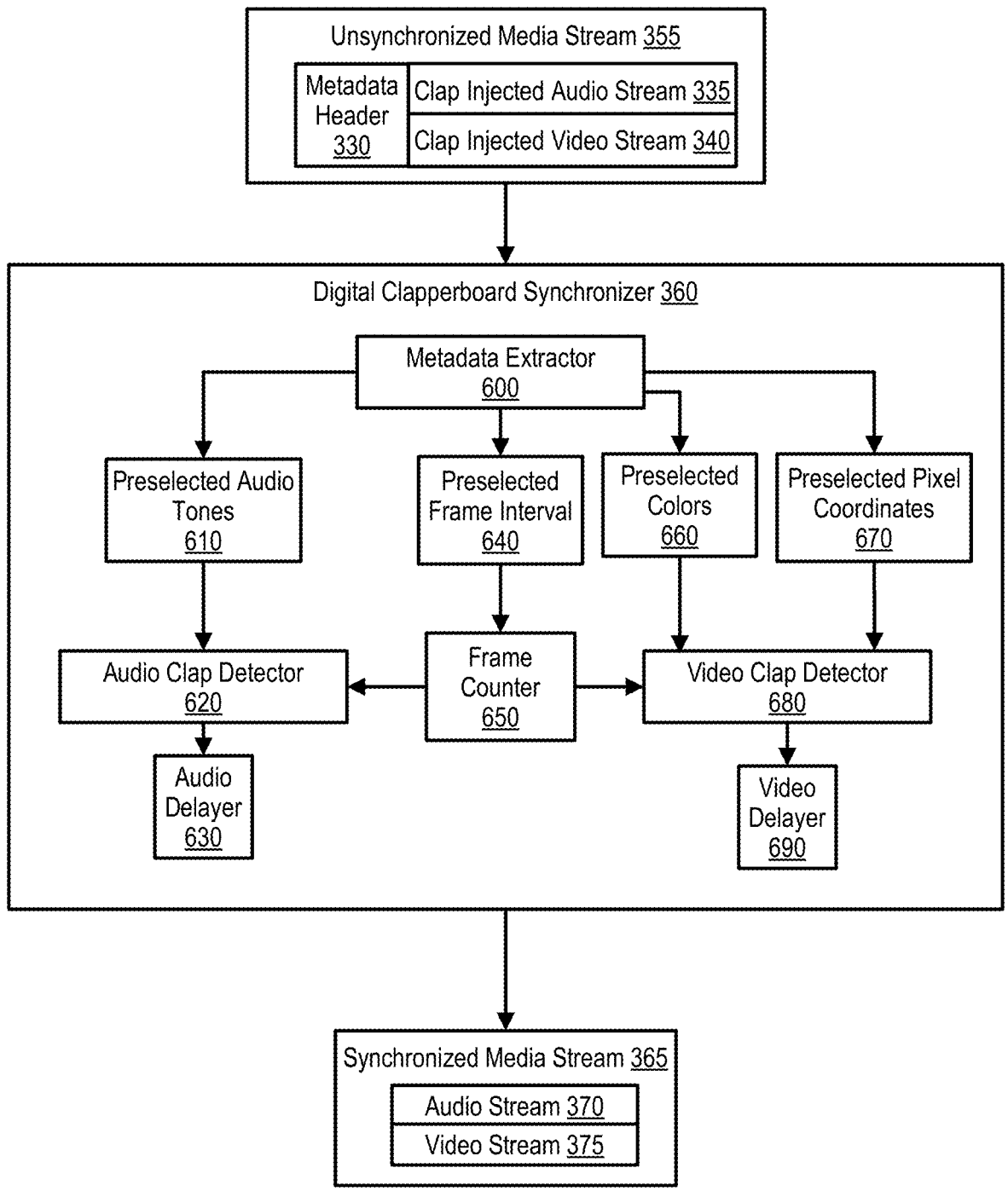
FIG. 6 is an exemplary diagram that depicts a digital clapperboard synchronizer using injected digital claps to synchronize an unsynchronized audio stream with a video stream.
Figure 8:
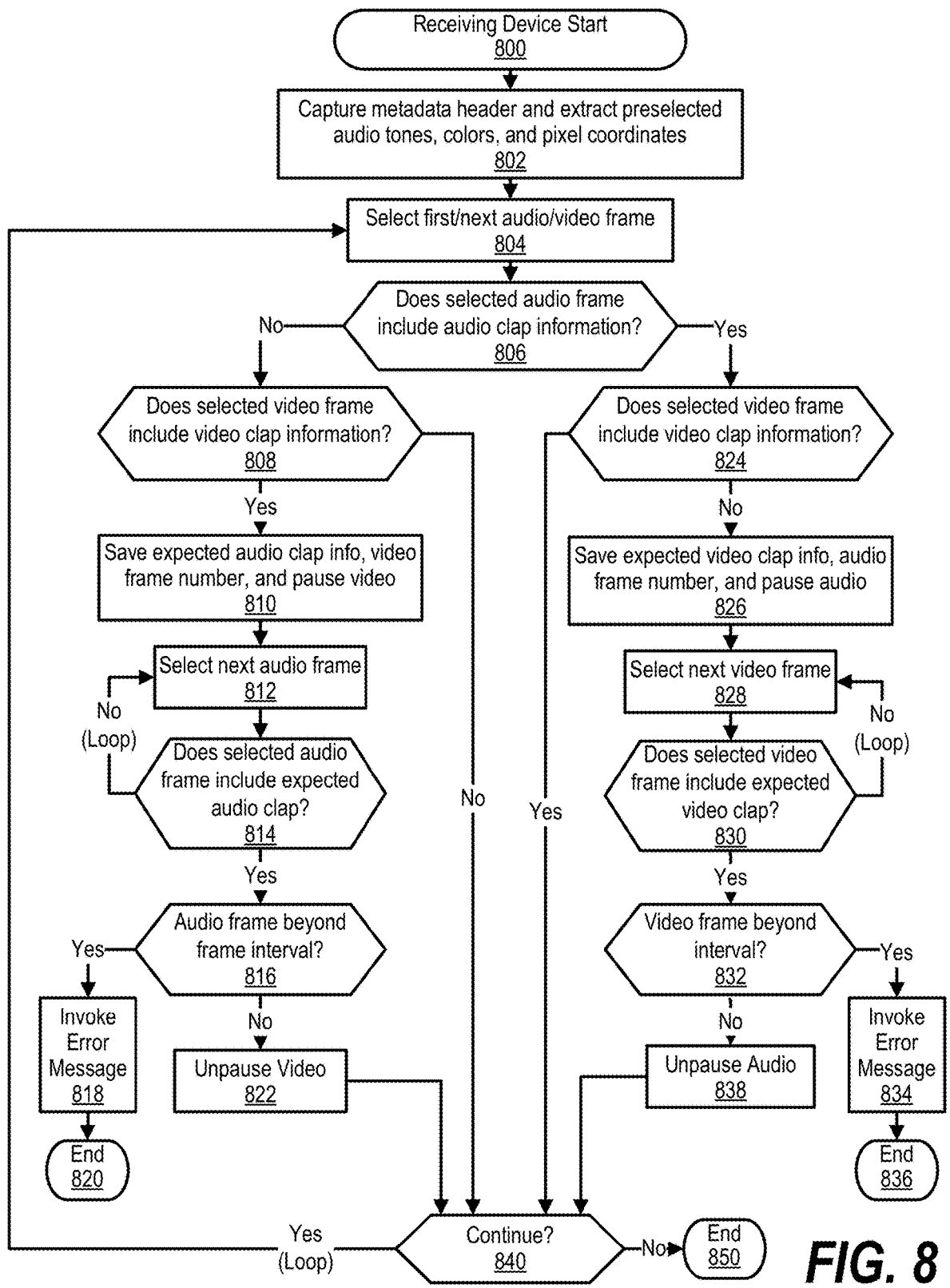
FIG. 8 is an exemplary flowchart showing steps taken to synchronize an audio stream with a video stream based on injected digital claps.

Digital clapperboard synchronizer 360 uses the clapperboard set information in both clap injected audio stream 335 and clap injected video stream 340 as discussed herein to synchronize the two streams and eventually produce synchronized media stream 365, which includes audio stream 370 (same as audio stream 310) and video stream 375 (same as video stream 315) that receiving device 350 presents to a user (see FIGS. 6, 8, 10, and corresponding text for further details).

Figure 4:
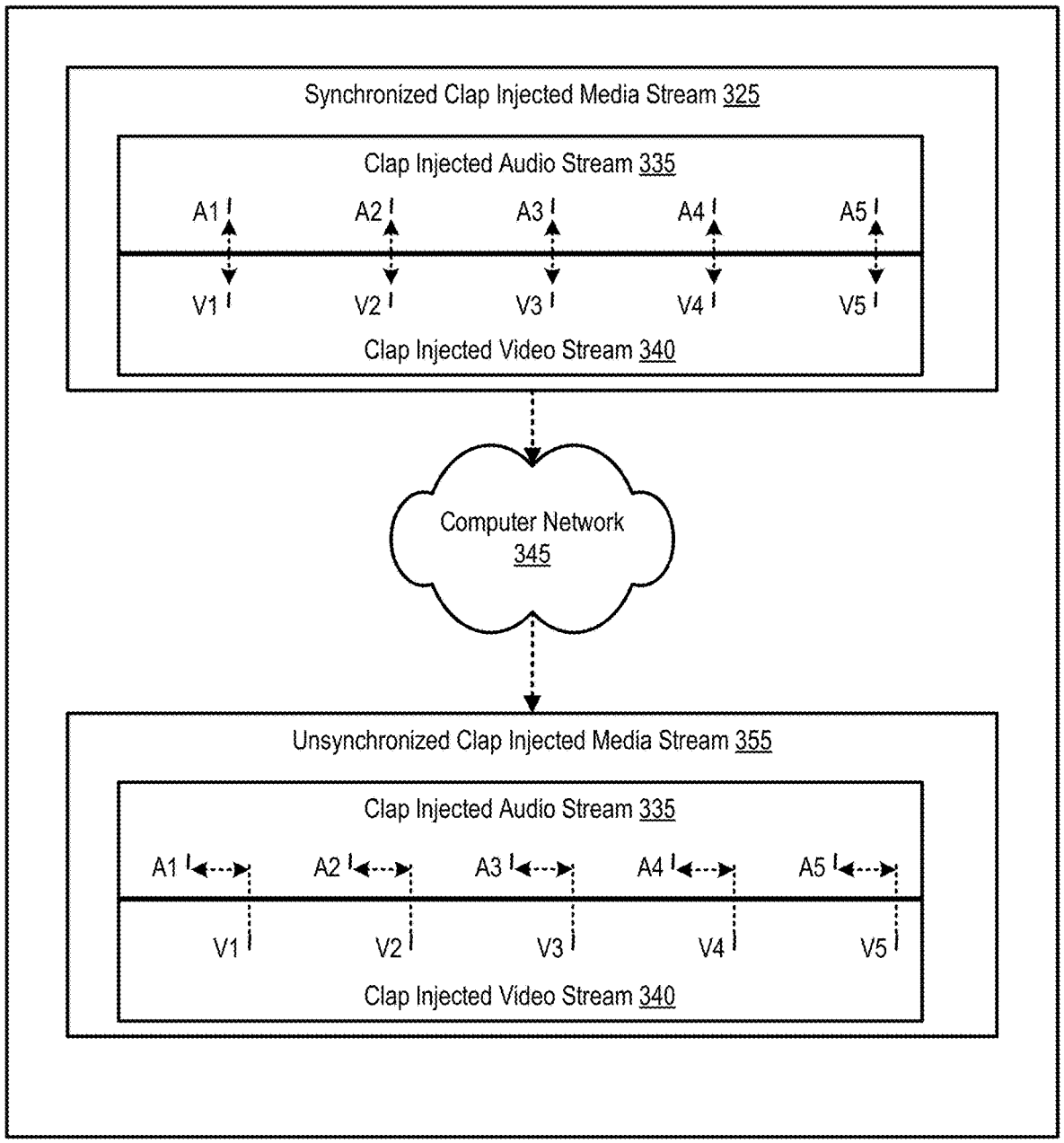
FIG. 4 is an exemplary diagram that depicts a clap injected media stream becoming unsynchronized as it traverses through a computer network.

FIG. 4 is an exemplary diagram that depicts a clap injected media stream becoming unsynchronized as it traverses through a computer network. Clap injected audio stream 335 includes audio claps A1, A2, A3, A4, and A5 injected at the predefined frame interval (e.g., every 500 frames). Clap injected video stream 340 includes corresponding video claps V1, V2, V3, V4, and V5 also injected at the predefined frame interval. At this point, clap injected audio stream 335 is synchronized with clap injected video stream 340.

When synchronized clap injected media stream 325 passes through computer network 345, the audio stream and video stream become unsynchronized (unsynchronized clap injected media stream 355). As can be seen, clap injected audio stream 335's audio claps A1, A2, A3, A4, and A5 are ahead in time of clap injected video stream 340's video claps V1, V2, V3, V4, and V5. As such, as discussed below, digital clapperboard synchronizer 360 will delay clap injected audio stream 335 until clap injected video stream 340 catches up and the two streams become synchronized.

Figure 5:
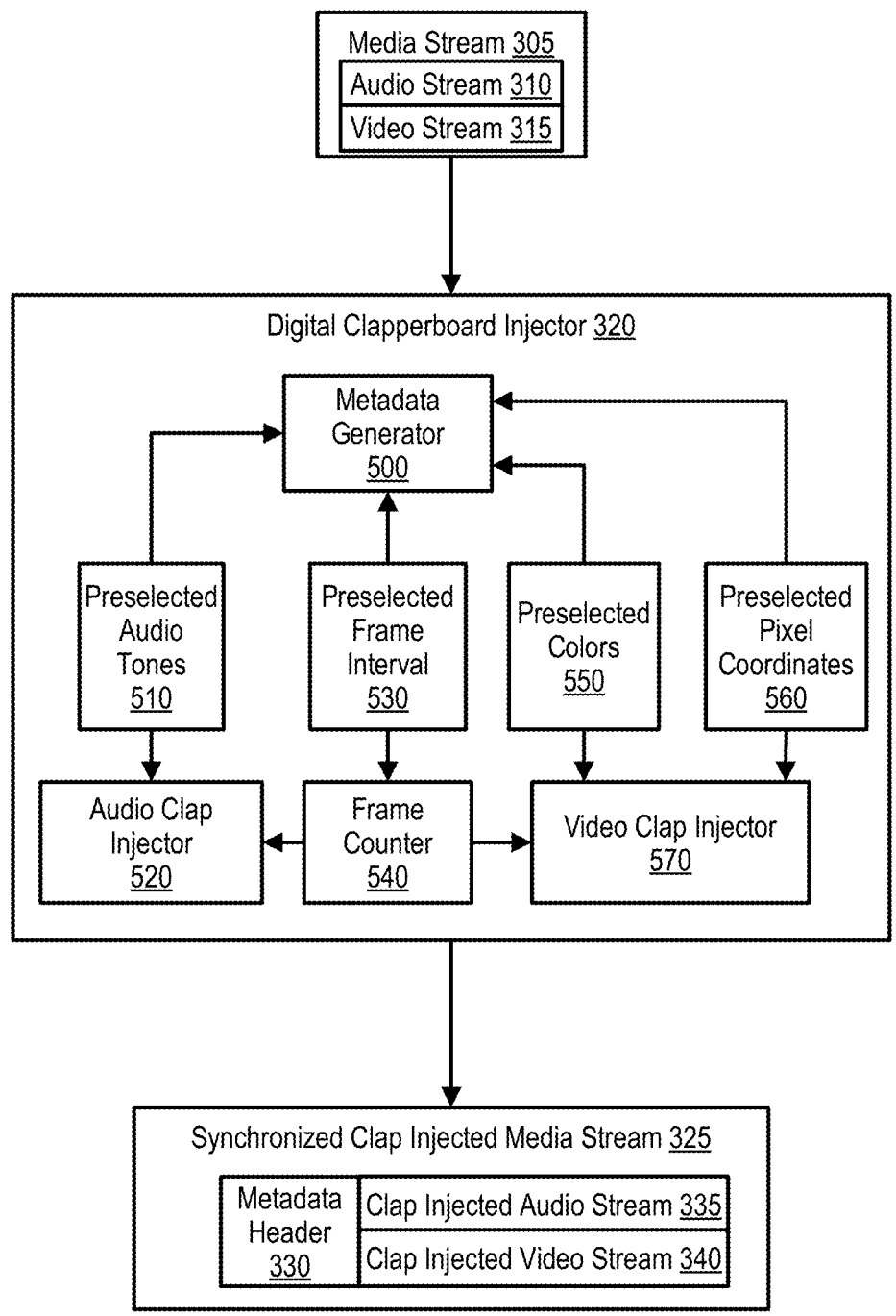
FIG. 5 is an exemplary diagram that depicts a digital clapperboard injector injecting digital claps into both an audio stream and a corresponding video stream.

FIG. 5 is an exemplary diagram that depicts a digital clapperboard injector injecting digital claps into both an audio stream and a corresponding video stream. Transmitting system 300 uses digital clapperboard injector 320 to inject audio claps into media stream 305's audio stream 310 in synchronicity with injecting video claps into media stream 305's video stream 315.

Digital clapperboard injector 320 stores preselected audio tones 510, preselected frame interval 530, preselected colors 550, and preselected pixel coordinates 560, each of which is selected by a user or a random number generator. Metadata generator 500 captures each of the preselected values and generates metadata header 330, which is sent to receiving device 350 via clap injected media stream 325.

Figure 7:
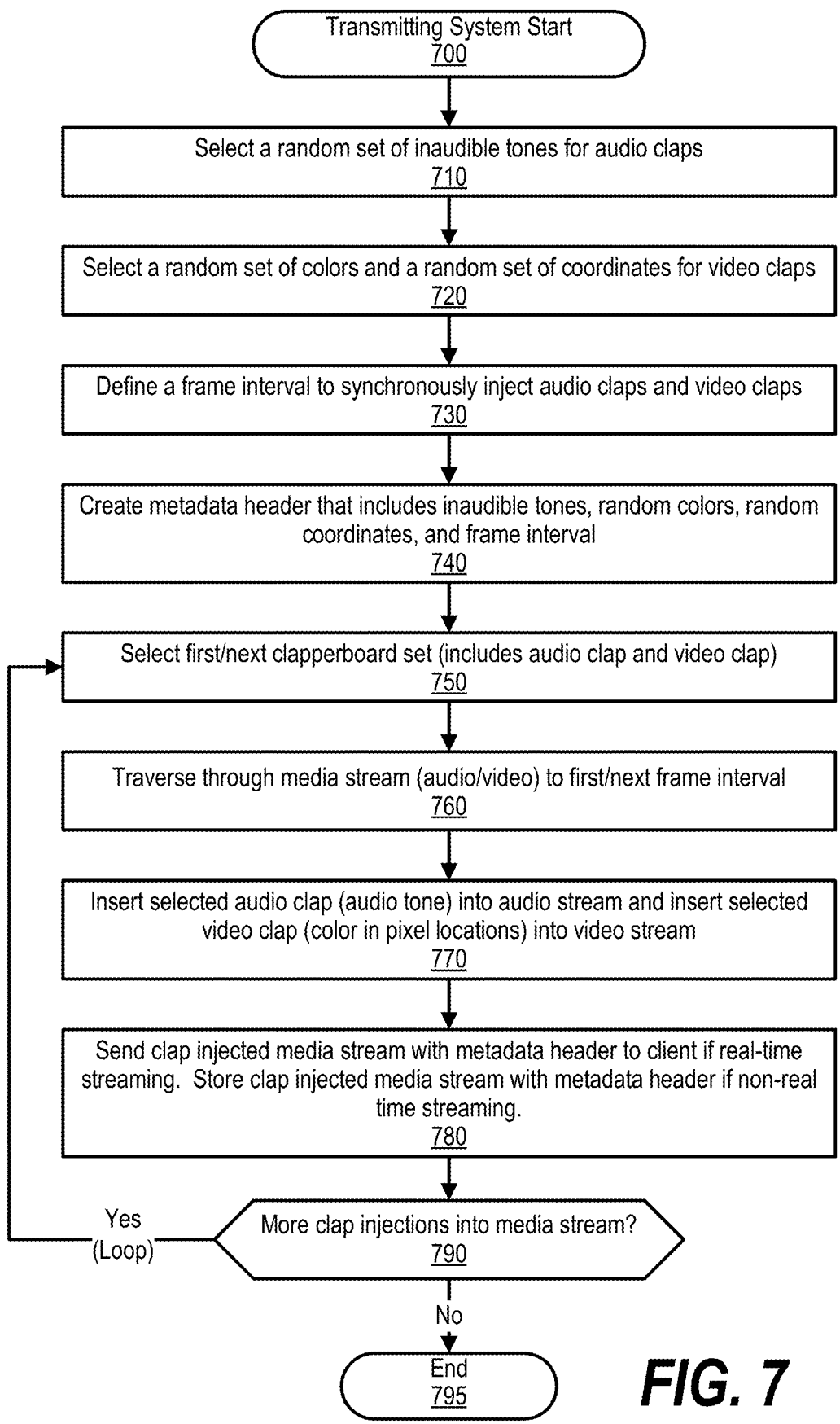
FIG. 7 is an exemplary flowchart showing steps taken to inject digital claps into a media stream.

Frame counter 540 receives preselected frame interval 530 and instructs both audio clap injector 520 and video clap injector 570 to inject their respective claps into their respective audio stream 310 and video stream 315 at the predetermined frame intervals (e.g., 500, 100, 1500, 2000, etc.) to create clap injected audio stream 335 and clap injected video stream 340 (see FIG. 7 and corresponding text for further details). In turn, transmitting system 300 sends synchronized clap injected media stream 325 to receiving device 350 over computer network 345 where receiving device 350 uses digital clapperboard synchronizer 360 to resynchronize the two streams (see FIG. 6 and corresponding text for further details).

FIG. 6 is an exemplary diagram that depicts a digital clapperboard synchronizer using injected digital claps to synchronize an unsynchronized audio stream with a video stream. Receiving device 350 uses digital clapperboard synchronizer 360 to synchronize unsynchronized media stream 355. Digital clapperboard synchronizer 360 uses metadata extractor 600 to extract audio clap information and video clap information from metadata header 330. Metadata extractor 600 then loads the audio clap information (tone values) into preselected audio tones 610 and loads the video clap information into preselected colors 660 and preselected pixel coordinates 670. Metadata extractor 600 also loads the extracted frame interval included in metadata header 330 into preselected frame interval 640, which frame counter 650 uses to determine whether audio or video delays are beyond the frame intervals (see FIG. 8 and corresponding text for further details).

Digital clapperboard synchronizer 360 loads preselected audio tones 610 into audio clap detector 620, which audio clap detector 620 uses to determine whether the inaudible tones (audio claps) are present in a given audio frame of clap injected audio stream 335. If necessary, as discussed in detail below, digital clapperboard synchronizer 360 uses audio delayer 630 to delay clap injected audio stream 335 when clap injected audio stream 335 is determined to be ahead of clap injected video stream 340 (see FIG. 8 and corresponding text for further details).

Digital clapperboard synchronizer 360 also loads preselected colors 660 and preselected pixel coordinates 670 into video clap detector 680, which video clap detector 680 uses to determine whether the preselected colors are present in the preselected coordinates in a given video frame. If necessary, as discussed in detail below, digital clapperboard synchronizer 360 uses video delayer 690 to delay clap injected video stream 340 when clap injected video stream 340 is determined to be ahead of clap injected audio stream 335 (see FIG. 8 and corresponding text for further details).

FIG. 7 is an exemplary flowchart showing steps taken to inject digital claps into a media stream. FIG. 7 processing commences at 700 whereupon, at step 710, the process selects a random set of inaudible tones for audio claps. For example, the process may use a random number generator to select four values from 1-20 and 20,000-22,000. At step 720, the process selects a random set of colors and a random set of pixel coordinates for video claps. For example, the process may use the random number generator to select values between 0-100 for red, green blue (RGB) values as well as x/y pixel coordinates between 0-1000. At step 730, the process defines a frame interval to synchronously inject audio claps and video claps, such as every 500 frames.

At step 740, the process creates a metadata header that includes the inaudible tone values, random color values, random coordinate values, and frame interval (see FIG. 5 and corresponding text for further details). At step 750, the process selects the first clapperboard set, which includes an audio tone, a pixel color, and pixel coordinates. At step 760, the process traverses through media stream 305 (audio/video) to the first frame interval. At step 770, the process inserts the selected audio clap (audio tone) into the audio stream and inserts the selected video clap (color in pixel locations) into the video stream. At step 780, the process sends the synchronized clap injected media stream with metadata header to client if the process is performing real-time streaming, or stores the clap injected media stream with the metadata header into a storage area if the process is performing non-real time streaming.

The process determines as to whether to inject more audio claps and video claps into media stream 305 (decision 790). If the process should inject more audio claps and video claps into media stream 305, then decision 790 branches to the 'yes' branch which loops back to select the next clapperboard set and inject audio claps and video claps at the predefined frame interval. This looping continues until the process should terminate (e.g., end of media stream 305), at which point decision 790 branches to the 'no' branch exiting the loop. FIG. 7 processing thereafter ends at 795.

FIG. 8 is an exemplary flowchart showing steps taken to synchronize an audio stream with a video stream based on injected digital claps. FIG. 8 processing commences at 800 whereupon, at step 802, the process captures metadata header 330 and extracts the preselected audio tones, colors, pixel coordinates, and frame interval information as discussed herein.

At step 804, the process selects the first audio/video frame, and determines as to whether the selected audio frame includes audio clap information corresponding to the first clapperboard set (decision 806). For example, the process checks whether the audio frame includes each of the four preselected inaudible tones. If the selected audio frame does not include the audio clap information, then decision 806 branches to the 'no' branch, whereupon the process determines as to whether the selected video frame includes the video clap information corresponding to the first clapperboard set (decision 808).

If the selected video frame does not include the video clap information, then decision 808 branches to the 'no' branch and bypassing steps 810-822 because neither of the selected frames includes clap information. On the other hand, if the selected video frame includes video clap information but the corresponding audio frame does not include the audio clap information (from decision 808), then decision 808 branches to the 'yes' branch whereupon, at step 810, the process saves the expected audio clap information, saves the current video frame number, and pauses the video because the video stream is ahead of the audio stream at this point.

At step 812, the process selects the next audio frame and determines as to whether the selected audio frame includes the expected audio clap information (decision 814). If the selected audio frame does not include the expected audio clap information, then decision 814 branches to the 'no' branch, which loops back to select the next audio frame. This looping continues until the selected audio frame includes the expected audio clap information, at which point decision 814 branches to the 'yes' branch exiting the loop.

The process determines as to whether the selected audio frame is beyond the frame interval relative to the stored video frame number (decision 816), such as greater than 500 frames from the stored video frame number. If the selected audio frame is beyond the frame interval, then decision 816 branches to the 'yes' branch whereupon, at step 818, the process invokes an Error Message and FIG. 8 processing thereafter ends at 820 because, for example, the audio stream and the video stream are unsynchronized more than the predefined frame interval.

On the other hand, if the selected audio frame is not beyond the frame interval, then decision 816 branches to the 'no' branch. At step 822, the process unpauses the video stream and the audio stream and video stream are now synchronized.

Referring back to decision 806, if the selected audio frame includes audio clap information, then decision 806 branches to the 'yes' branch whereupon the process determines as to whether the selected video frame includes the corresponding video clap information (decision 824). If the selected video frame includes the corresponding video clap information, then decision 824 branches to the 'yes' branch, bypassing steps 824-836 and indicating that the audio stream and video stream are synchronized because they both include their respective clap information.

On the other hand, if the selected video frame does not include video clap information, then decision 824 branches to the 'no' branch whereupon, at step 826, the process saves the expected video clap information, saves the audio frame number, and pauses the audio stream because the audio stream is ahead of the video stream at this point.

At step 828, the process selects the next video frame and determines as to whether the selected video frame includes the expected video clap information (decision 830). If the selected video frame does not include the expected video clap information, then decision 830 branches to the 'no' branch which loops back to select and process the next video frame. This looping continues until the selected video frame includes the expected video clap information, at which point decision 830 branches to the 'yes' branch exiting the loop.

The process determines as to whether the selected video frame is beyond the frame interval (decision 832). If the selected video frame is beyond the frame interval, then decision 832 branches to the 'yes' branch whereupon, at step 834, the process invokes and Error Message and FIG. 8 processing thereafter ends at 836 because, for example, the video stream and the audio stream are unsynchronized more than the predefined frame interval.

On the other hand, if the selected video frame is not beyond the frame interval, then decision 832 branches to the 'no' branch. At step 838, the process unpauses the audio stream and is now synchronized with the video stream.

The process determines as to whether to continue processing the receiving media stream (decision 840). If the process should continue, then decision 840 branches to the 'yes' branch which loops back to select and process the next audio/video frame. This looping continues until the process should terminate, at which point decision 840 branches to the 'no' branch exiting the loop. FIG. 8 processing thereafter ends at 850.

FIG. 9 is an exemplary diagram that depicts pseudo-code of a digital clapperboard injector. Pseudo-code 900 includes frame interval 910, audio clap information 920, and video clap information 930. Frame interval 910 is set to 500 frames and audio clap information 920 is set to tones 10, 15, 20000, and 21000. Video clap information 930 includes four sets of video clap information, each of which includes color values and pixel coordinate values.

Pseudo-code 900 also includes code 940, which loops through each frame and injects the audio clap information and video clap information at respective frame intervals to generate clap injected audio stream 335 and clap injected video stream 340. Using the example shown in FIG. 9, digital clapperboard injector 320 injects the following into media stream 305 at the first four frame intervals:

$500^{th}$ Frame: TONE: 10, PIXEL: color: [20, 78, 103], coordinates: [[10, 10], [20, 20], [30, 30]];
$1,000^{th}$ Frame: TONE: 15, PIXEL: color: [91, 210, 4], coordinates: [[50, 50], [60, 60], [70, 70]];
$1,500^{th}$ Frame: TONE: 20000, PIXEL: color: [256, 34, 67], coordinates: [[80, 80], [90, 90], [100, 100]];
$2,000^{th}$ Frame: TONE: 21000, PIXEL: color: [92, 82, 14], coordinates: [[110, 110], [120, 120], [130, 130]];

FIG. 10 is an exemplary diagram that depicts pseudo-code of a digital clapperboard synchronizer. Receiving device 350 uses pseudo-code 1000 to perform steps shown in FIG. 8 that evaluates clap injected audio stream 335 against clap injected video stream 340.

When clap injected audio stream 335 is ahead of clap injected video stream 340, pseudo-code 1000 pauses clap injected audio stream 335 (1010) until clap injected video stream 340 catches up, at which point pseudo-code 1000 unpauses clap injected audio stream 335 (1030).

Likewise, when clap injected audio stream 335 is behind clap injected video stream 340, pseudo-code 1000 pauses clap injected video stream 340 (1020) until clap injected audio stream 335 catches up, at which point pseudo-code 1000 unpauses clap injected video stream 340 (1040).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving, at a receiving device, a media stream comprising a metadata header, an audio stream and a video stream;
   extracting, from the metadata header, synchronization information comprising a set of audio tone values corresponding to a set of inaudible audio tones, a set of color values corresponding to a set of colors, and a set of pixel location values corresponding to a set of pixel locations, wherein the audio stream comprises the set of inaudible audio tones inserted at a set of predetermined frame intervals, and wherein the video stream comprises the set of colors inserted at the set of pixel locations at the predetermined frame intervals;
   in response to extracting the synchronization information, determining that a selected audio frame in the audio stream at which the set of inaudible audio tones corresponding to the extracted set of audio tone values are inserted is misaligned in time with a selected video frame in the video stream at which the set of colors corresponding to the extracted set of color values are inserted at the set of pixel locations corresponding to the extracted set of pixel location values; and
   synchronizing the audio stream with the video stream at one of the set of predetermined frame intervals in response to the determination.

2. The method of claim 1 further comprising:
   detecting, at a first point in time, that the selected audio frame includes at least one inaudible tone in the set of inaudible audio tones; and
   pausing the audio stream in response to determining that a first video frame located at the first point in time fails to include a first one of the set colors at a corresponding first one of the set of pixel locations.

3. The method of claim 2 further comprising:
   detecting, at a second point in time, that a second video frame includes the first one of the set colors at the corresponding first one of the set of pixel locations; and
   unpausing the audio stream at the second point in time.

4. The method of claim 1 further comprising:
   detecting, at a first point in time, that the selected video frame includes a first one of the set of colors at a corresponding first one of the set of pixel locations; and
   pausing the video stream in response to determining that a first audio frame located at the first point in time fails to include at least one inaudible tone in the set of inaudible audio tones.

5. The method of claim 4 further comprising:
   detecting, at a second point in time, that a second audio frame includes the at least one inaudible tone; and
   unpausing the video stream at the second point in time.

6. The method of claim 1 further comprising:
creating the metadata header at a transmitting device;
injecting, at the transmitting device, the set of inaudible audio tones into the audio stream at the predetermined frame intervals;
injecting, at the transmitting device, the set of colors at the set of pixel locations into the video stream at the predetermined frame intervals; and
sending the metadata header with the injected audio stream and the injected video stream to the receiving device.

7. An information handling system comprising:
one or more processors;
a memory coupled to at least one of the processors;
a set of computer program instructions stored in the memory and executed by at least one of the processors in order to perform actions of:
receiving, at a receiving device, a media stream comprising a metadata header, an audio stream and a video stream;
extracting, from the metadata header, synchronization information comprising a set of audio tone values corresponding to a set of inaudible audio tones, a set of color values corresponding to a set of colors, and a set of pixel location values corresponding to a set of pixel locations, wherein the audio stream comprises the set of inaudible audio tones inserted at a set of predetermined frame intervals, and wherein the video stream comprises the set of colors inserted at the set of pixel locations at the predetermined frame intervals;
in response to extracting the synchronization information, determining that a selected audio frame in the audio stream at which the set of inaudible audio tones corresponding to the extracted set of audio tone values are inserted is misaligned in time with a selected video frame in the video stream at which the set of colors corresponding to the extracted set of color values are inserted at the set of pixel locations corresponding to the extracted set of pixel location values; and
synchronizing the audio stream with the video stream at one of the set of predetermined frame intervals in response to the determination.

8. The information handling system of claim 7 wherein the processors perform additional actions comprising:
detecting, at a first point in time, that the selected audio frame includes at least one inaudible tone in the set of inaudible audio tones; and
pausing the audio stream in response to determining that a first video frame located at the first point in time fails to include a first one of the set colors at a corresponding first one of the set of pixel locations.

9. The information handling system of claim 8 wherein the processors perform additional actions comprising:
detecting, at a second point in time, that a second video frame includes the first one of the set colors at the corresponding first one of the set of pixel locations; and
unpausing the audio stream at the second point in time.

10. The information handling system of claim 7 wherein the processors perform additional actions comprising:
detecting, at a first point in time, that the selected video frame includes a first one of the set of colors at a corresponding first one of the set of pixel locations; and pausing the video stream in response to determining that a first audio frame located at the first point in time fails to include at least one inaudible tone in the set of inaudible audio tones.

11. The information handling system of claim 10 wherein the processors perform additional actions comprising:
detecting, at a second point in time, that a second audio frame includes the at least one inaudible tone; and
unpausing the video stream at the second point in time.

12. The information handling system of claim 7 wherein the processors perform additional actions comprising:
creating the metadata header at a transmitting device;
injecting, at the transmitting device, the set of inaudible audio tones into the audio stream at the predetermined frame intervals;
injecting, at the transmitting device, the set of colors at the set of pixel locations into the video stream at the predetermined frame intervals; and
sending the metadata header with the injected audio stream and the injected video stream to the receiving device.

13. A computer program product stored in a computer readable storage medium, comprising computer program code that, when executed by an information handling system, causes the information handling system to perform actions comprising:
receiving, at a receiving device, a media stream comprising a metadata header, an audio stream and a video stream;
extracting, from the metadata header, synchronization information comprising a set of audio tone values corresponding to a set of inaudible audio tones, a set of color values corresponding to a set of colors, and a set of pixel location values corresponding to a set of pixel locations, wherein the audio stream comprises the set of inaudible audio tones inserted at a set of predetermined frame intervals, and wherein the video stream comprises the set of colors inserted at the set of pixel locations at the predetermined frame intervals;
in response to extracting the synchronization information, determining that a selected audio frame in the audio stream at which the set of inaudible audio tones corresponding to the extracted set of audio tone values are inserted is misaligned in time with a selected video frame in the video stream at which the set of colors corresponding to the extracted set of color values are inserted at the set of pixel locations corresponding to the extracted set of pixel location values; and
synchronizing the audio stream with the video stream at one of the set of predetermined frame intervals in response to the determination.

14. The computer program product of claim 13 wherein the information handling system performs further actions comprising:
detecting, at a first point in time, that the selected audio frame includes at least one inaudible tone in the set of inaudible audio tones; and
pausing the audio stream in response to determining that a first video frame located at the first point in time fails to include a first one of the set colors at a corresponding first one of the set of pixel locations.

15. The computer program product of claim 14 wherein the information handling system performs further actions comprising:
- detecting, at a second point in time, that a second video frame includes the first one of the set colors at the corresponding first one of the set of pixel locations; and
- unpausing the audio stream at the second point in time.

16. The computer program product of claim 13 wherein the information handling system performs further actions comprising:
- detecting, at a first point in time, that the selected video frame includes a first one of the set of colors at a corresponding first one of the set of pixel locations; and
- pausing the video stream in response to determining that a first audio frame located at the first point in time fails to include at least one inaudible tone in the set of inaudible audio tones.

17. The computer program product of claim 16 wherein the information handling system performs further actions comprising:
- detecting, at a second point in time, that a second audio frame includes the at least one inaudible tone and
- unpausing the video stream at the second point in time.

* * * * *